(12) United States Patent
Mariyani et al.

(10) Patent No.: US 11,968,642 B1
(45) Date of Patent: Apr. 23, 2024

(54) USER EQUIPMENT (UE) STATUS INFORMATION DELIVERY IN A WIRELESS COMMUNICATION NETWORK

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 388 days.

(21) Appl. No.: 17/493,181

(22) Filed: Oct. 4, 2021

(51) Int. Cl.
| | |
|---|---|
| *H04W 60/00* | (2009.01) |
| *H04L 9/40* | (2022.01) |
| *H04L 65/1069* | (2022.01) |
| *H04W 8/22* | (2009.01) |
| *H04W 12/06* | (2021.01) |

(52) U.S. Cl.
CPC ............ *H04W 60/00* (2013.01); *H04L 63/08* (2013.01); *H04L 65/1069* (2013.01); *H04W 8/22* (2013.01); *H04W 12/06* (2013.01)

(58) Field of Classification Search
CPC ....... H04W 8/22; H04W 12/06; H04W 60/00; H04L 63/08; H04L 65/1069

USPC ....................................................... 455/435.1
See application file for complete search history.

(56) References Cited

U.S. PATENT DOCUMENTS

| | | | |
|---|---|---|---|
| 8,203,982 | B2 | 6/2012 | Mutikainen et al. |
| 8,787,362 | B2 | 7/2014 | Atarius et al. |
| 9,413,561 | B2 | 8/2016 | Keller et al. |
| 9,503,484 | B2 | 11/2016 | Zisimopoulos et al. |
| 9,872,317 | B2 | 1/2018 | Baek et al. |
| 10,178,541 | B2 | 1/2019 | Carbone et al. |
| 10,477,607 | B2 | 11/2019 | Buckley et al. |

*Primary Examiner* — Joel Ajayi (57) ABSTRACT

A wireless communication network delivers status information for User Equipment (UE) upon request. A network controller exchanges registration signaling with the UE and exchanges authentication signaling for the UE with a Unified Data Management (UDM). The UDM exchanges the authentication signaling with the network controller and responsively transfers a UDM request for the UE status information to the network controller. The network controller determines the UE status information and transfers the UE status information to the UDM in response to the UDM request. The UDM receive the UE status information from the network controller and transfers the UE status information to a Unified Data Repository (UDR). The UDR receives the UE status information from the UDM and receives a status request for the UE from a network element. The UDR responsively transfers the UE status information for the UE to the network element.

20 Claims, 11 Drawing Sheets

USER EQUIPMENT (UE) STATUS INFORMATION DELIVERY IN A WIRELESS COMMUNICATION NETWORK

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Unified Data Repositories (UDRs), Unified Data Management (UDM), Access and Mobility Management Functions (AMFs), Session Management Functions (SMFs), User Plane Functions (UPFs), and the like.

An Internet Protocol Multimedia Subsystem (IMS) typically includes an IP-based telephony system for placing and receiving voice calls. To use the IMS, the wireless user devices obtain IP addresses from their wireless communication networks and register their IP addresses and corresponding telephone numbers with the IMS. To place a call, the calling wireless user device transfers a Session Initiation Protocol (SIP) message to the IMS with the telephone numbers of the calling and called wireless user devices. The IMS translates the telephone number of the called user device into its IP address and transfers a SIP message with the telephone numbers of the calling and called wireless user devices to that IP address. If the called wireless user device accepts the call, the called user device returns a SIP message to the IMS with the call acceptance. In response to the call acceptance, the IMS transfers SIP messaging to the calling and called wireless user devices to indicate the IP address of the other device. The called and calling wireless user devices then exchange voice data using the IP addresses. In some scenarios, each wireless communication network has its own IMS and the IMSs interact to handle voice calls in a distributed manner. When a wireless user device visits another wireless communication network and its IMS, the visited network and visited IMS exchange signaling with the home network and home IMS to serve the visiting UE with voice calling.

Within the IMS, a Telephony Application Server (TAS), manages the various communication paths that serve the voice call. Before selecting an access path for a wireless user device, the TAS first requests current status information for the wireless user device from the wireless communication network. The status information indicates voice-calling capabilities, access technology, and the like. The wireless communication network gathers and transfers the requested user information to the TAS. The TAS then selects the voice-calling access network based on the current status data for the wireless user device.

Network Exposure Functions (NEFs) expose network information to other network elements like the current location and access network for a wireless user device. Application Functions (AFs) interact with the NEFs over Application Programming Interfaces (APIs) to obtain the network information. The AFs may transfer the network information for a wireless user device to an Application Server (AS) that is operated by an entity that controls the wireless user device.

Unfortunately, the wireless communication networks do not efficiently and effectively gather status information for the wireless user devices. Moreover, the wireless communication networks force the network elements to wait before receiving the requested status information which delays service delivery to the wireless user devices.

TECHNICAL OVERVIEW

A wireless communication network delivers status information for User Equipment (UE) upon request. A network controller exchanges registration signaling with the UE and exchanges authentication signaling for the UE with a Unified Data Management (UDM). The UDM exchanges the authentication signaling with the network controller and responsively transfers a UDM request for the UE status information to the network controller. The network controller determines the UE status information and transfers the UE status information to the UDM in response to the UDM request. The UDM receive the UE status information from the network controller and transfers the UE status information to a Unified Data Repository (UDR). The UDR receives the UE status information from the UDM and receives a status request for the UE from a network element. The UDR responsively transfers the UE status information for the UE to the network element.

DETAILED DESCRIPTION

Figure 1:
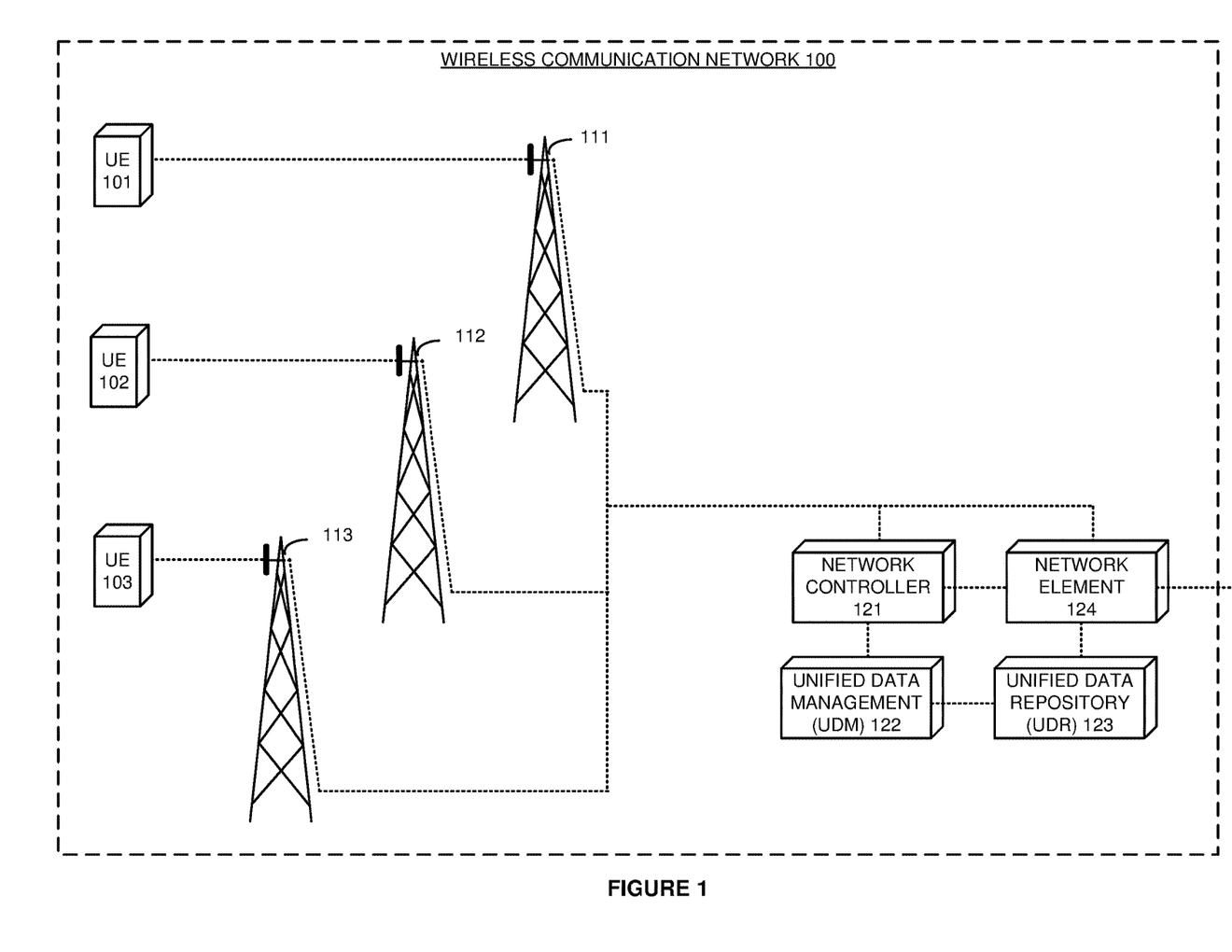
FIG. 1 illustrates an exemplary wireless communication network that serves User Equipment (UEs) and delivers UE status information for the UEs upon request.

FIG. 1 illustrates exemplary wireless communication network 100 that serves User Equipment (UEs) 101-103 and deliver UE status information for UEs 101-103 upon request. Wireless communication network 100 comprises UEs 101-103, wireless access nodes 111-113, network controller 121, Unified Data Management (UDM) 122, Unified Data Repository (UDR) 123, network element 124. UEs 101-103 comprise computers, phones, vehicles, sensors, robots, or some other data appliance with communication circuitry. Network element 124 comprises an Application Function (AF), Network Exposure Function (NEF), Home Subscriber System (HSS), Telephony Application Server (TAS), and/or some other network apparatus. Network controller 121 comprises an Access and Mobility Management Function (AMF), Mobility Management Entity (MME), and/or some other network control-plane. Wireless communication network 100 is simplified for clarity and typically includes far more UEs, access nodes, and network elements than shown.

Various examples of network configuration and operation are described herein. In some examples, network controller 121 exchanges registration signaling with UEs 101-103 over wireless access nodes 111-113. In response, network controller 121 exchanges authentication signaling for UEs 101-103 with UDM 122. UDM 122 exchanges the authentication signaling with network controller 121, and in response, UDM 122 transfers UDM requests for UE status information for individual UEs 101-103 to network controller 121. Network controller 121 exchanges network signaling with UEs 101-103 and determines the UE status information. The UE status information indicates: a time of last radio contact with the UE, a Radio Access Technology (RAT) type serving the UE, Voice over Packet (VoP) capability for the UE, Internet Protocol Multimedia Subsystem (IMS) capability for the UE, Session Initiation Protocol (SIP) capability for the UE, geographic location for the UE, successful authentication for the UE, and/or some other UE metadata. Network controller 121 receives the UDM requests, and in response to the UDM requests, network controller 121 transfers the UE status information for individual UEs 101-103 to UDM 122. UDM 122 receives the UE status information from network controller 121 and transfers the UE status information to UDR 123. UDR 123 receives the UE status information from UDM 123. UDR 123 receives a status request for an individual one of UEs 101-103 from network element 124 and responsively transfers the UE status information for the individual one of UEs 101-103 to network element 124. Advantageously, wireless communication network 100 efficiently and effectively gathers status information for UEs 101-103. Moreover, wireless communication network 100 serves the status information to network element 124 with a minimal wait to speed-up service-delivery to UEs 101-103.

UEs 101-103 and wireless access nodes 111-113 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. The components of wireless communication network 100 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-103 and wireless access nodes 111-113 comprise radios. UEs 101-103, wireless access nodes 111-113, network controller 121, UDM 122, UDR 123, and network element 124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
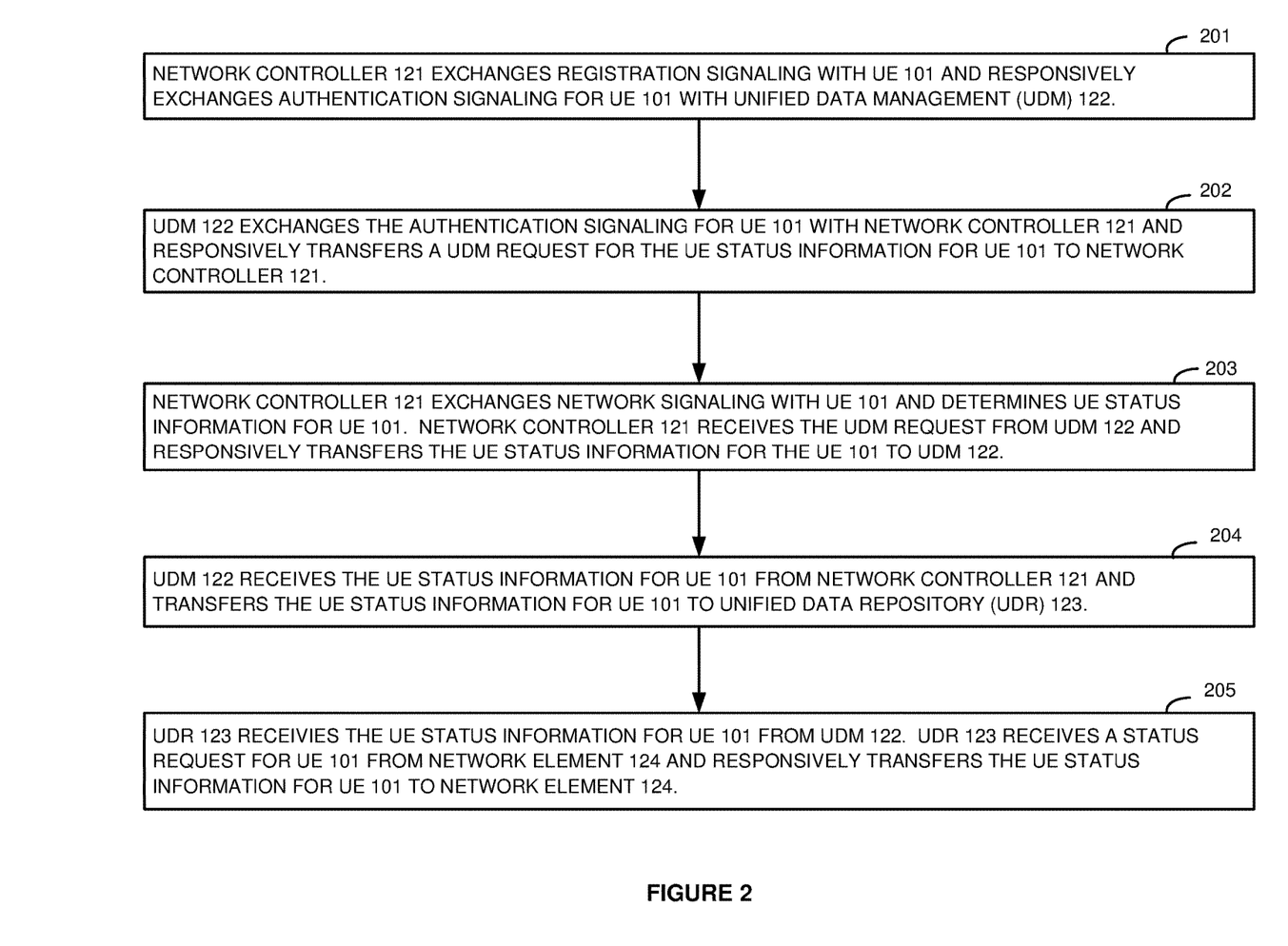
FIG. 2 illustrates an exemplary operation of the wireless communication network to serve the UEs and deliver the UE status information for the UEs upon request.

FIG. 2 illustrates an exemplary operation of wireless communication network 100 to serve UE 101 and deliver UE status information for UE 101 upon request. Network controller 121 exchanges registration signaling with UE 101 over wireless access node 111 and responsively exchanges authentication signaling for UEs 101-103 with UDM 122 (201). UDM 122 exchanges the authentication signaling with network controller 121 (202). In response, UDM 122 transfers a UDM request for UE status information for UE 101 to network controller 121 (202). Network controller 121 exchanges network signaling with UE 101 and determines the UE status information (203). Network controller 121 receives the UDM request, and in response to the UDM request, network controller 121 transfers the UE status information for UE 101 to UDM 122 (203). UDM 122 receives the UE status information from network controller 121 and transfers the UE status information to UDR 123 (204). UDR 123 receives the UE status information from UDM 123 (205). UDR 123 receives a status request for UE 101 from network element 124 and responsively transfers the UE status information for UE 101 to network element 124 (205).

Figure 3:
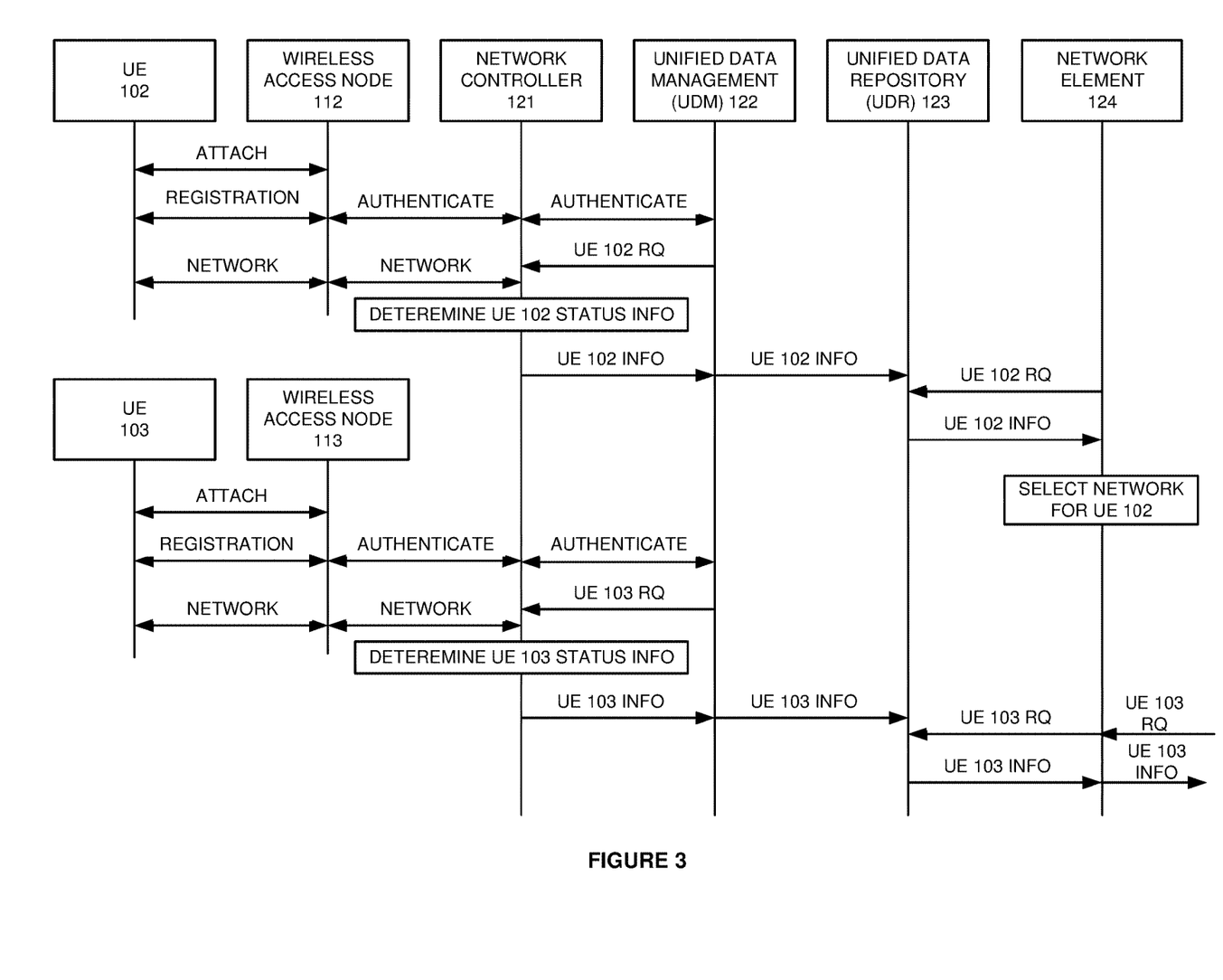
FIG. 3 illustrates an exemplary operation of the wireless communication network to serve the UEs and deliver the UE status information for the UEs upon request.

FIG. 3 illustrates an exemplary operation of wireless communication network 100 to serve UEs 102-103 and deliver UE status information for UEs 102-103 upon request. UE 102 wirelessly attaches to wireless access node 112. UE 102 and network controller 121 exchange registration signaling over wireless access node 112. In response, network controller 121 and UDM 122 exchange authentication signaling for UE 102. UDM 122 transfers a UDM request for UE status information for UE 102 to network controller 121 in response to the authentication of UE 102. UE 102 and network controller 121 exchange network signaling. Network controller 121 determines UE status information for UE 102. Network controller 121 transfers the UE status information for UE 102 to UDM 122. UDM 122 transfers the UE status information for UE 102 to UDR 123. UDR 123 receives a status request for UE 102 from network element 124 and responsively transfers the UE status information for UE 102 to network element 124. In this example, network element 124 selects an access network type for UE 102 based on the UE status information for UE 102. For example, network element 124 may select a different wireless communication network for UE 102 to use for a voice call based on UE capabilities and network status.

UE 103 wirelessly attaches to wireless access node 113. UE 103 and network controller 121 exchange registration signaling over wireless access node 113. In response, network controller 121 and UDM 122 exchange authentication signaling for UE 103. UDM 122 transfers a UDM request for UE status information for UE 103 to network controller 121 in response to the authentication of UE 103. UE 103 and network controller 121 exchange network signaling. Network controller 121 determines UE status information for UE 103. Network controller 121 transfers the UE status information for UE 103 to UDM 122. UDM 122 transfers the UE status information for UE 103 to UDR 123. Network element 124 receives a status request for UE 103 from an external system and responsively transfers a status request for UE 103 to UDR 123. UDR 123 receives the status request for UE 103 from network element 124 and responsively transfers the UE status information for UE 103 to network element 124. Network element 124 transfers the UE status information for UE 103 to the external system in response to the status request. For example, network element 124 may comprise a Network Exposure Function (NEF) and Application Function (AF) that serve UE status data to an external Application Server (AS).

Figure 4:
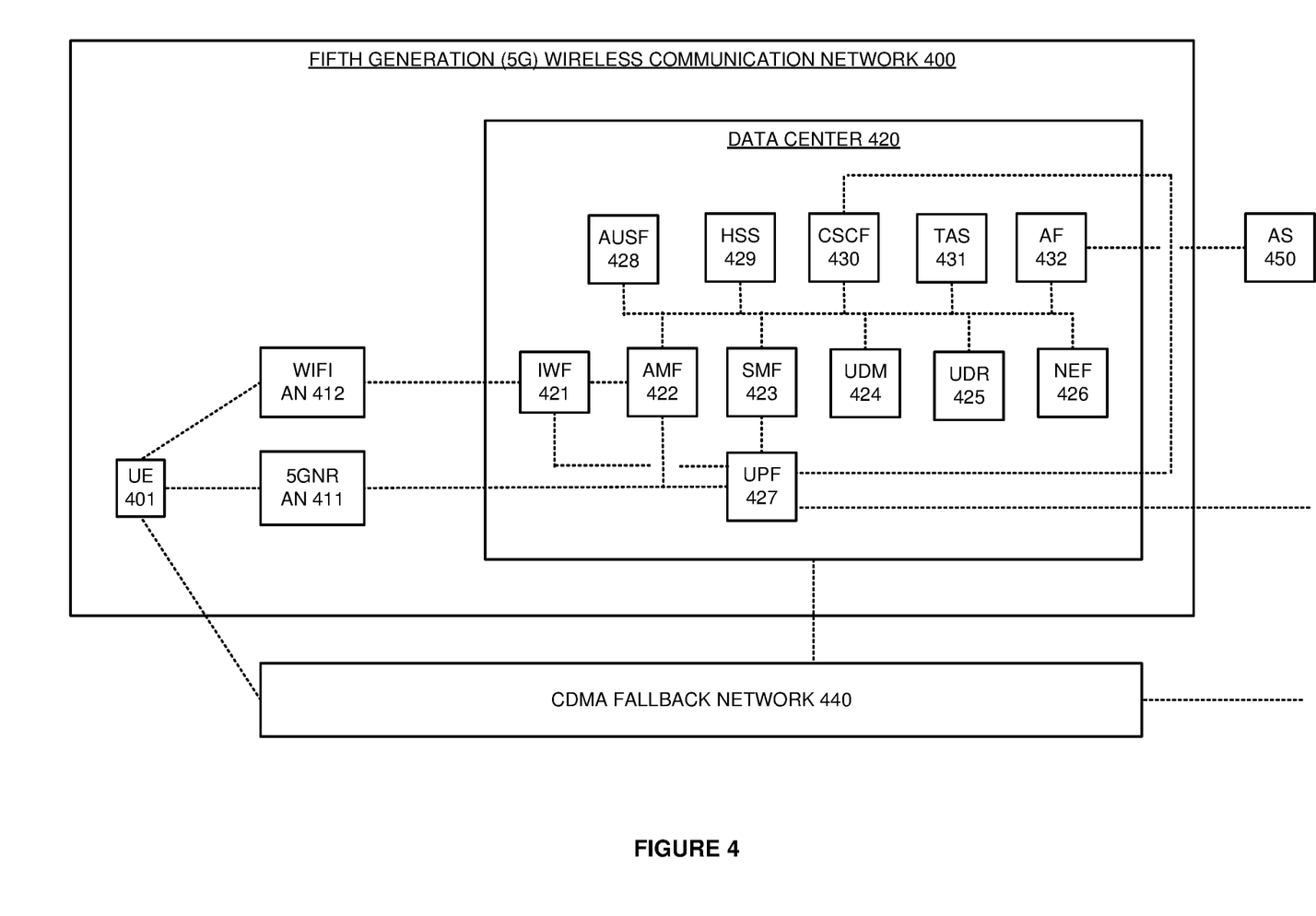
FIG. 4 illustrates an exemplary Fifth Generation (5G) wireless communication network that serves a UE and delivers UE status information for the UE upon request.

FIG. 4 illustrates an exemplary Fifth Generation (5G) wireless communication network 400 that serves UE 401 and delivers UE status information for UE 401 upon request. 5G wireless communication network 400 comprises an example of wireless communication network 100, although network 100 may differ. 5G wireless communication network 400 comprises: UE 401, 5GNR Access Node (AN) 411, WIFI AN 412, and data center 420. Data center 420 comprises Interworking Function (IWF) 421, Access and Mobility Management Function (AMF) 422, Session Management Function (SMF) 423, Unified Data Management (UDM) 424, Unified Data Repository (UDR) 425, Network Exposure Function (NEF) 426, User Plane Function (UPF) 427, Authentication and Security Function (AUSF) 428, Home Subscriber System (HSS) 429, Call State Control Functions (CSCF) 430, Telephony Application Server (TAS) 431, and Application Function (AF) 432. Wireless communication network 400 is simplified for clarity and typically includes far more UEs, ANs, data centers, and network functions than shown.

UE 401 wirelessly attaches to 5GNR AN 411. UE 401 and AMF 422 exchange registration signaling over 5GNR AN 411. The registration signaling reports UE capabilities to AMF 422 like Voice over Packet (VoP) capability, Internet Protocol Multimedia Subsystem (IMS) capability, Session Initiation Protocol (SIP) capability, and geographic location. In response to the registration signaling, AMF 422 and UDM 424 exchange authentication signaling for UE 401 over AUSF 428. In response to the authentication of UE 401, UDM 424 subscribes to UE status information for UE 401 from AMF 422. AMF 422 interacts with UDM 424 to select initial context for UE 401. AMF 422 interacts with SMF 423 and other network functions to select slices, policies, addresses, and additional context for UE 401. Part of the context characterizes an IMS bearer between UE 401 and CSCF 430 over 5GNR AN 411 and UPF 427. SMF 423 directs UPF 427 to serve the IMS bearer for UE 401. AMF 422 directs AN 411 to serve the IMS bearer for UE 401. AMF 422 directs UE 401 to use the IMS bearer over 5GNR AN 411. UE 401 and CSCF 430 exchange IMS registration signaling over the IMS bearer which traverses 5GNR AN 411 and UPF 427. CSCF 430 and HSS 429 exchange IMS registration data for UE 401.

In response to the subscription for UE 401 from UDM 424, AMF 422 identifies UE status information that indicates: a time of last radio contact, a RAT type (5GNR in this example), VoP capability, IMS capability, SIP capability, geographic location, successful authentication, and/or some other UE metadata. AMF 422 transfers the UE status data for UE 401 to UDM 424 to serve the subscription. UDM 424 transfers the UE status data for UE 401 to UDR 425. UDR 425 may now deliver the UE status data for UE 401 to TAS 431, NEF 426, and/or some other network element upon request.

UE 401 places a multimedia call by transferring a SIP invite for the called-party to CSCF 430 over the IMS bearer. CSCF 430 transfers the invite to TAS 431. TAS 431 queries HSS 429 for the UE status information for UE 401. HSS 429 retrieves the UE status information for UE 401 from UDR 425 and responds to TAS 431 with the UE status information for UE 401. TAS 431 selects an access network type for UE 401 based on the UE status information for UE 401. TAS 431 might select a Voice over New Radio (VoNR) network that traverses 5GNR AN 411 and UPF 427 based on a 5GNR VoP capability for UE 401. TAS 431 might select Code Division Multiple Access (CDMA) fallback network 440 for UE 401 based on an inadequate VoP capability for UE 401. TAS 431 informs CSCF 430 of the selected access network type for UE 401. CSCF 430 informs AMF 422 of the selected access network type for UE 401—typically over a Policy Control Function (PCF). AMF 422 signals UE 401 over 5GNR AN 411 to use the selected access network type. UE 401 typically uses the VoNR network that traverses AN 411 and UPF 427 if UE 401 is VoNR capable and the VoNR network is available. UE 401 typically uses CDMA fallback network 440 when UE 401 is not VoNR capable or when the VoNR network is unavailable.

UE 401 receives a multimedia call in a similar manner. CSCF 430 receives a SIP invite for UE 401 from another UE or CSCF. CSCF 430 transfers the invite to TAS 431. TAS 431 obtains the UE status information for UE 401 as above. TAS 431 selects the access network type for UE 401 based on the UE status information as described above.

In some examples, AS 450 has an affiliation with UE 401 like employer/employee, parent/child, sensor/owner, or the like. AS 450 logs-in to AF 432 and requests UE status information for UE 401. AF 432 requests the UE status information for UE 401 from NEF 431. NEF 431 requests the UE status information for UE 401 from UDR 425. UDR 425 already has the UE status information for UE 401 as described above. UDR 425 transfers the UE status information for UE 401 to NEF 431. NEF 431 transfers the UE status information for UE 401 to AF 432. AF 432 transfers the UE status information for UE 401 to AS 432 for use by the employer, parent, or other affiliated entity.

In some examples, UE 401 wirelessly attaches to WIFI AN 412. UE 401 registers with IWF 421 over WIFI AN 412 and establishes a secure tunnel. IWF 421 and AMF 422 exchange registration signaling for UE 401. AMF 422 and UDM 424 exchange authentication signaling for UE 401 over AUSF 428. In response, UDM 424 subscribes to UE status information for UE 401 from AMF 422. Aside from the use of WIFI AN 412 and IWF 421, the operation for placing and receiving multimedia calls is like that described above—although the RAT type is now WIFI. The operation for AS 450 would also be similar. For example, AS 450 could use the UE status information to determine UE location and whether UE 401 is attached to 5GNR, WIFI, or some other RAT type at the location.

Figure 5:
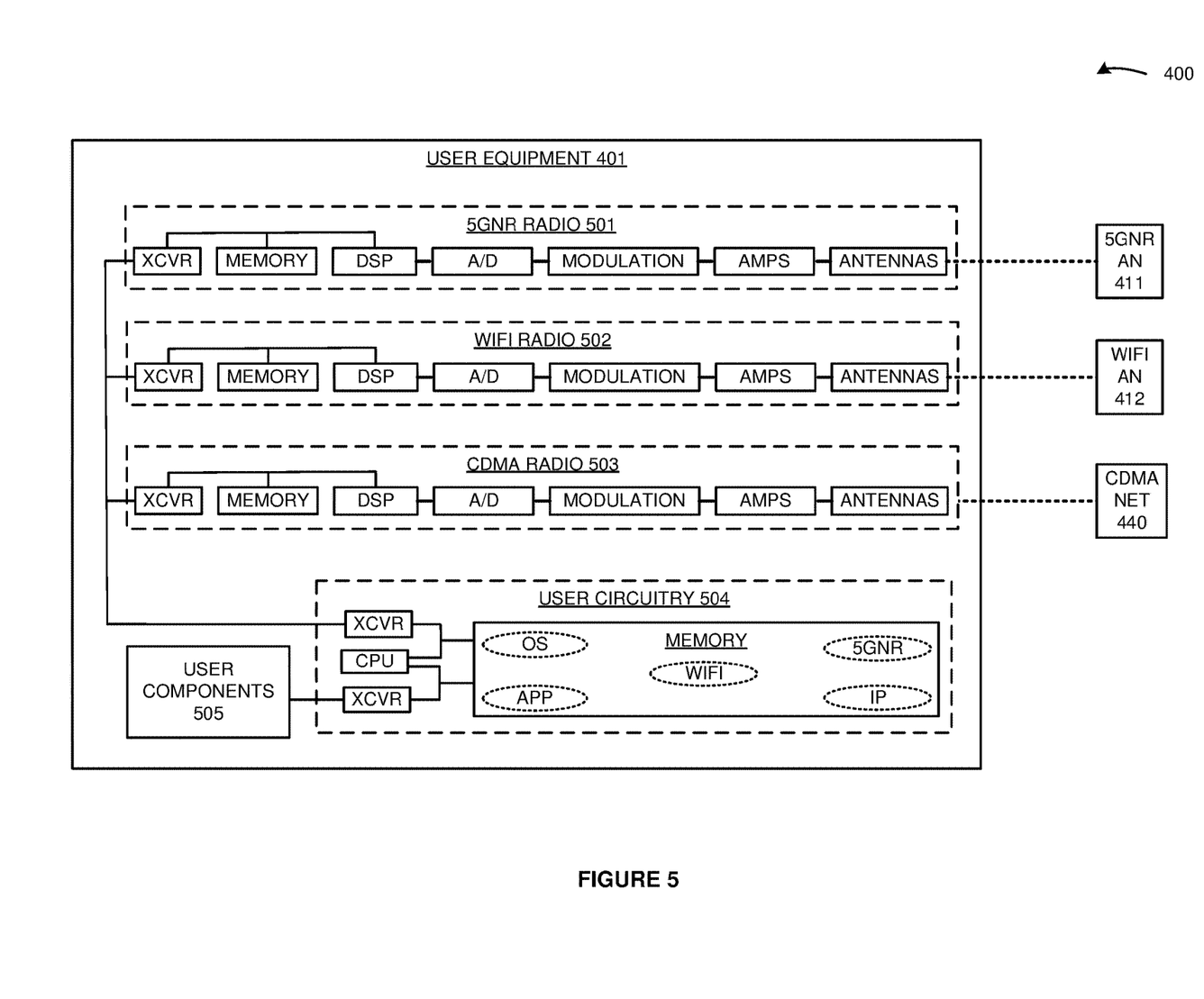
FIG. 5 illustrates an exemplary UE in the 5G wireless communication network.

FIG. 5 illustrates exemplary UE 401 in 5G wireless communication network 400. UE 401 comprises an example of UEs 101-103, although these UEs may differ. UE 401 comprises 5GNR radio 501, WIFI radio 502, CDMA radio 503, user circuitry 504, and user components 505. User components 505 comprise sensors, controllers, displays, or some other user apparatus that generates slice data. Radios 501-503 comprise antennas, amplifiers, filters, modulation, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, 5GNR, and IP. The antennas in 5GNR radio 501 are wirelessly coupled to 5GNR AN 411 over a 5GNR link. The antennas in WIFI radio 502 are wirelessly coupled to WIFI AN 412 over a WIFI link. The antennas in CDMA radio 503 are wirelessly coupled to CDMA network 440 AN 412 over a CDMA link. Transceivers (XCVRs) in radios 501-503 are coupled to transceivers in user circuitry 504. Transceivers in user circuitry 504 are coupled to user components 505. The CPU in user circuitry 504 executes the operating system, user applications, and network applications to exchange network signaling and user data with ANs 411-412 and network 440 over radios 501-503.

Figure 6:
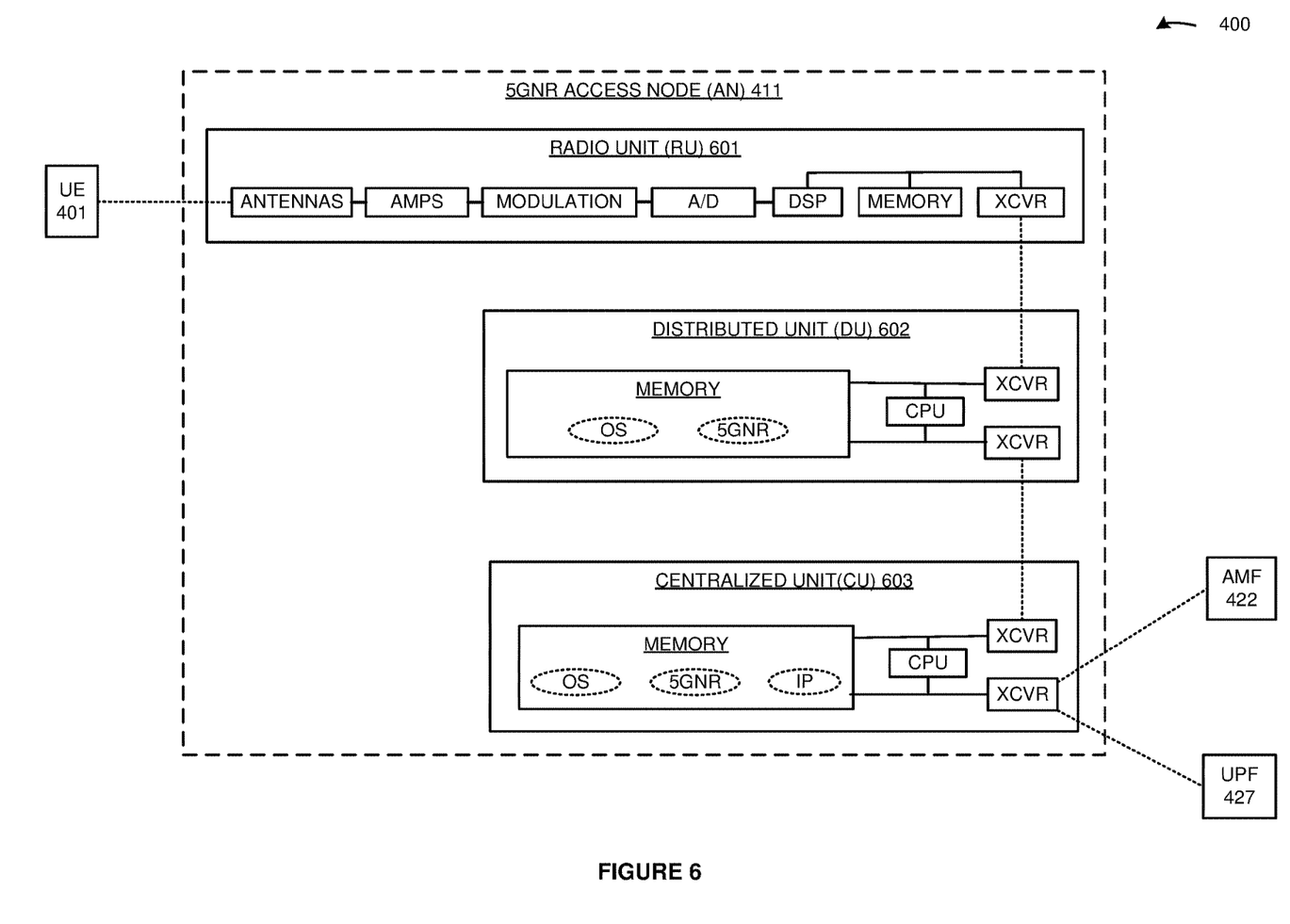
FIG. 6 illustrates an exemplary 5G new radio access node in the 5G wireless communication network.

FIG. 6 illustrates exemplary 5G New Radio (NR) Access Node (AN) 411 in 5G wireless communication network 400. 5GNR AN 411 comprises an example of wireless access nodes 111-113, although access nodes 111-113 may differ. 5GNR AN 411 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system, IP, and 5GNR network applications (Packet Data Convergence Protocol, Service Data Adaptation Protocol, Radio Resource Control). The antennas in RU 601 are wirelessly coupled to UE 401 over a 5GNR link. Transceivers in RU 601 are coupled to transceivers in DU 602. Transceivers in DU 602 are coupled to transceivers in CU 603. Transceivers in CU 603 are coupled to AMF 422 and UPF 427. The DSP and CPU in RU 601, DU 602, and CU 603 execute operating systems, radio applications, and 5GNR applications to exchange network signaling and user data with UE 401, AMF 422, and UPF 427.

Figure 7:
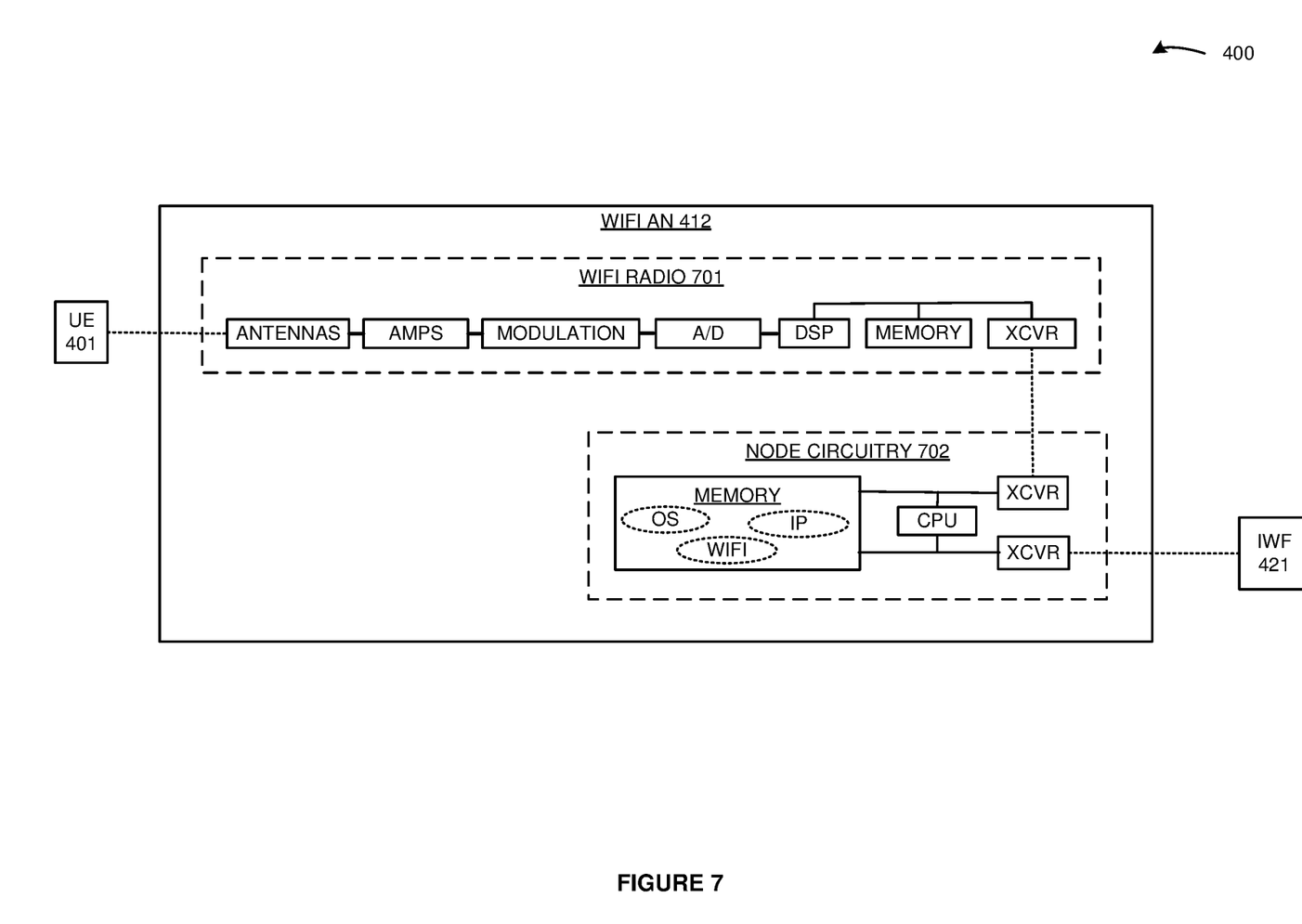
FIG. 7 illustrates an exemplary wireless fidelity access node in the 5G wireless communication network.

FIG. 7 illustrates exemplary WIFI AN node 412 in 5G wireless communication network 400. WIFI AN node 412 comprises an example of wireless access nodes 111-113, although access nodes 111-113 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and WIFI. The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 421. The CPU in node circuitry 702 executes the operating system and network applications to exchange network signaling and user data with UE 401 and with IWF 421.

Figure 8:
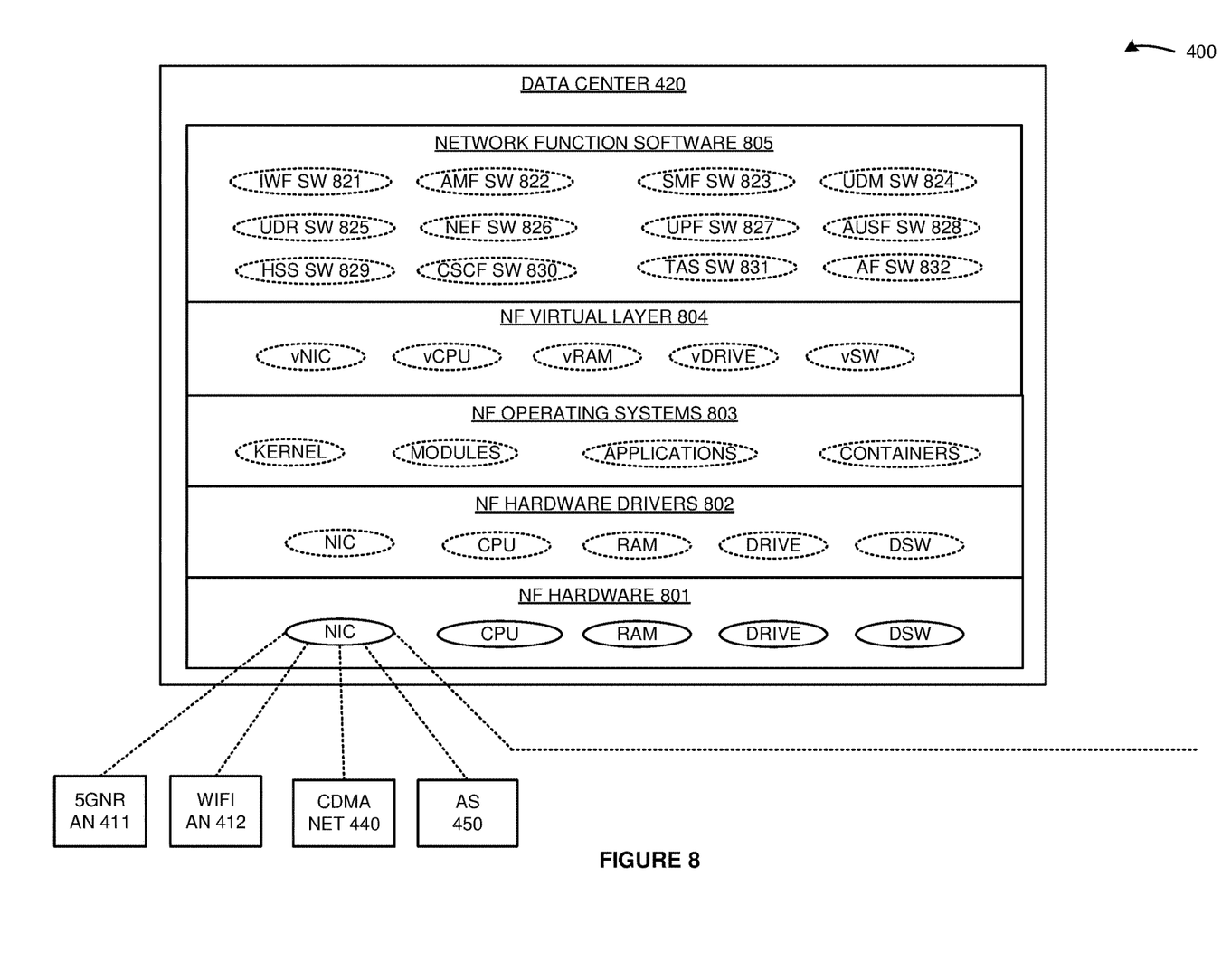
FIG. 8 illustrates an exemplary data center in the 5G wireless communication network.

FIG. 8 illustrates exemplary data center 420 in 5G wireless communication network 400. Data center 420 comprises an example of network controller 121, UDM 122, UDR 123, and network element 124, although controller 121, UDM 122, UDR 123, and element 124 may differ. Data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 821, AMF SW 822, SMF SW 823, UDM SW 824, UDR SW 825, NEF SW 826, UPF SW 827, AUSF SW 828, HSS SW 829, CSCF SW 830, TAS SW 831, and AF SW 832. Other NFs like Policy Control Function (PCF) and Network Repository Function (NRF) are typically present but are omitted for clarity. Data center 420 may be located at a single site or be distributed across multiple geographic locations. The NIC in NF hardware 801 are coupled to 5GNR AN 411, WIFI AN 412, CDMA network 440, AS 450, and external systems. NF hardware 801 executes NF hardware drivers 802, NF operating systems 803, NF virtual layer 804, and NF SW 805 to form and operate IWF 421, AMF 422, SMF 423, UDM 424, UDR 425, NEF 426, UPF 427, AUSF 428, HSS 429, CSCF 430, TAS 431, and AF 432.

Figure 9:
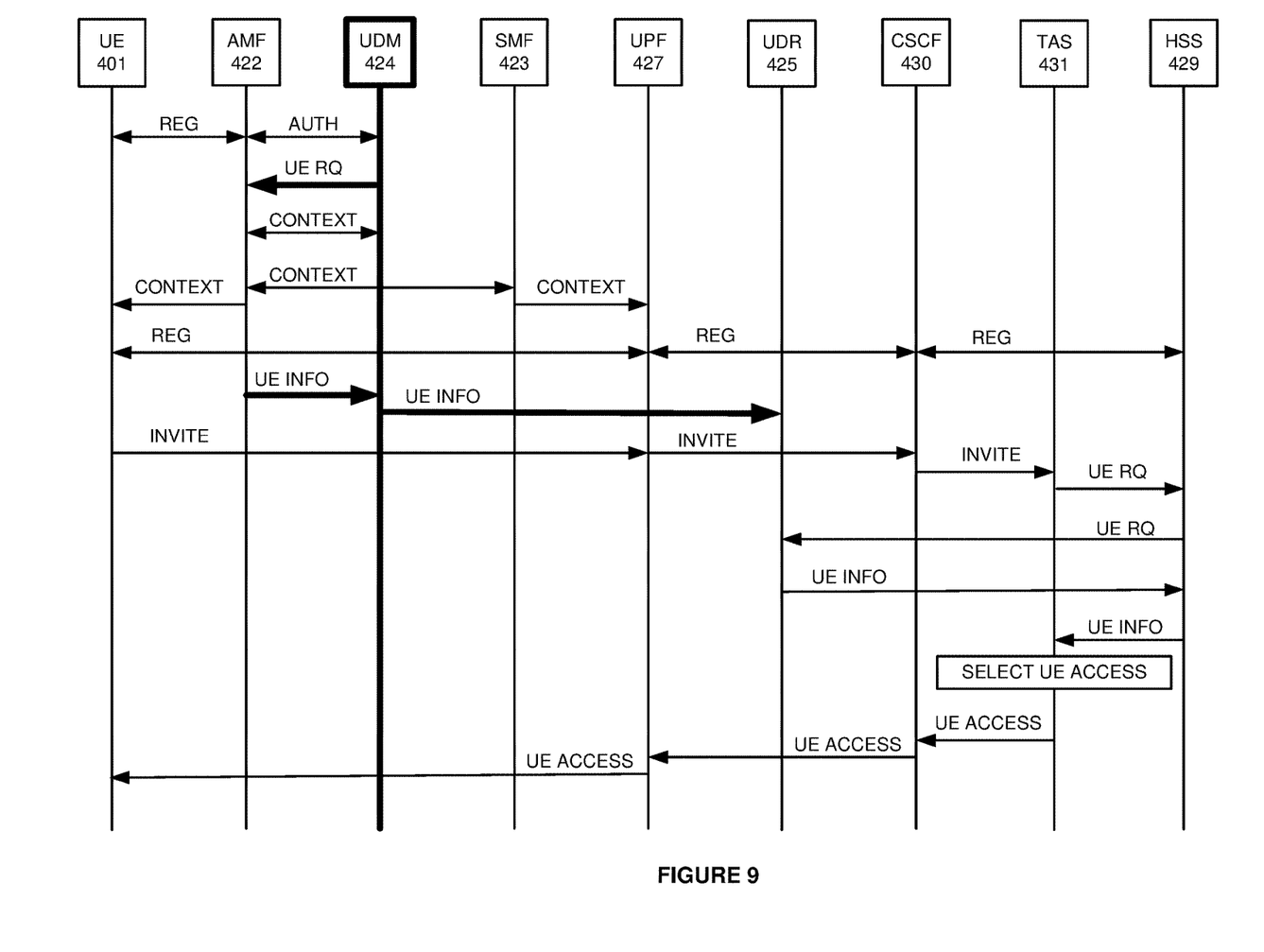
FIG. 9 illustrates an exemplary operation of the 5G wireless communication network to serve the UE and deliver the UE status information for the UE upon request.

FIG. 9 illustrates an exemplary operation of 5G wireless communication network to serve UE 401 and deliver the UE status information for UE 401 upon request. The operation may vary in other examples. UE 401 and AMF 422 exchange registration signaling (REG). The registration signaling reports UE capabilities to AMF 422 like VoP capability, IMS capability, SIP capability, geographic location, and authentication. In response to the registration signaling, AMF 422 and UDM 424 exchange authentication signaling (AUTH) for UE 401. In response to the authentication of UE 401, UDM 424 requests (RQ) UE status information for UE 401 from AMF 422. AMF 422 interacts with UDM 424 to select initial context for UE 401. AMF 422 interacts with SMF 423 and other network functions to select slices, policies, addresses, and additional context for UE 401. Part of the context characterizes an IMS bearer between UE 401 and CSCF 430 over UPF 427. SMF 423 directs UPF 427 to serve the IMS bearer for UE 401 per the context. AMF 422 directs UE 401 to use the IMS bearer over 5GNR AN 411 per the context. UE 401 and CSCF 430 exchange IMS registration signaling over the IMS bearer which traverses UPF 427. CSCF 430 and HSS 429 exchange IMS registration data for UE 401. In response to the subscription for UE 401 from UDM 424, AMF 422 identifies UE status information that indicates: last radio contact, RAT type, VoP capability, IMS capability, SIP capability, geographic location, successful authentication, and/or some other UE metadata. AMF 422 transfers the UE status data for UE 401 to UDM 424 to serve the subscription. UDM 424 transfers the UE status data for UE 401 to UDR 425. UE 401 places a multimedia call by transferring a SIP invite for the called-party to CSCF 430 over the IMS bearer served by UPF 427. CSCF 430 transfers the invite to TAS 431. TAS 431 queries HSS 429 for the UE status information for UE 401 (UE RQ). HSS 429 retrieves the UE status information for UE 401 from UDR 425 and responds to TAS 431 with the UE status information for UE 401. TAS 431 selects an access network type for UE 401 based on the UE status information for UE 401. TAS 431 might select a VoNR based on a 5GNR VoP capability for UE 401. TAS 431 might select CDMA fallback for UE 401 based on an inadequate VoP capability for UE 401. TAS 431 informs CSCF 430 of the selected access network type for UE 401. CSCF 430 informs AMF 422 of the selected access network type for UE 401—typically over a PCF. AMF 422 signals UE 401 to use the selected access network type. UE 401 typically uses the VoNR network that traverses UPF 427 if UE 401 is VoNR capable. UE 401 typically uses CDMA fallback network 440 when UE 401 is not VoNR capable.

Figure 10:
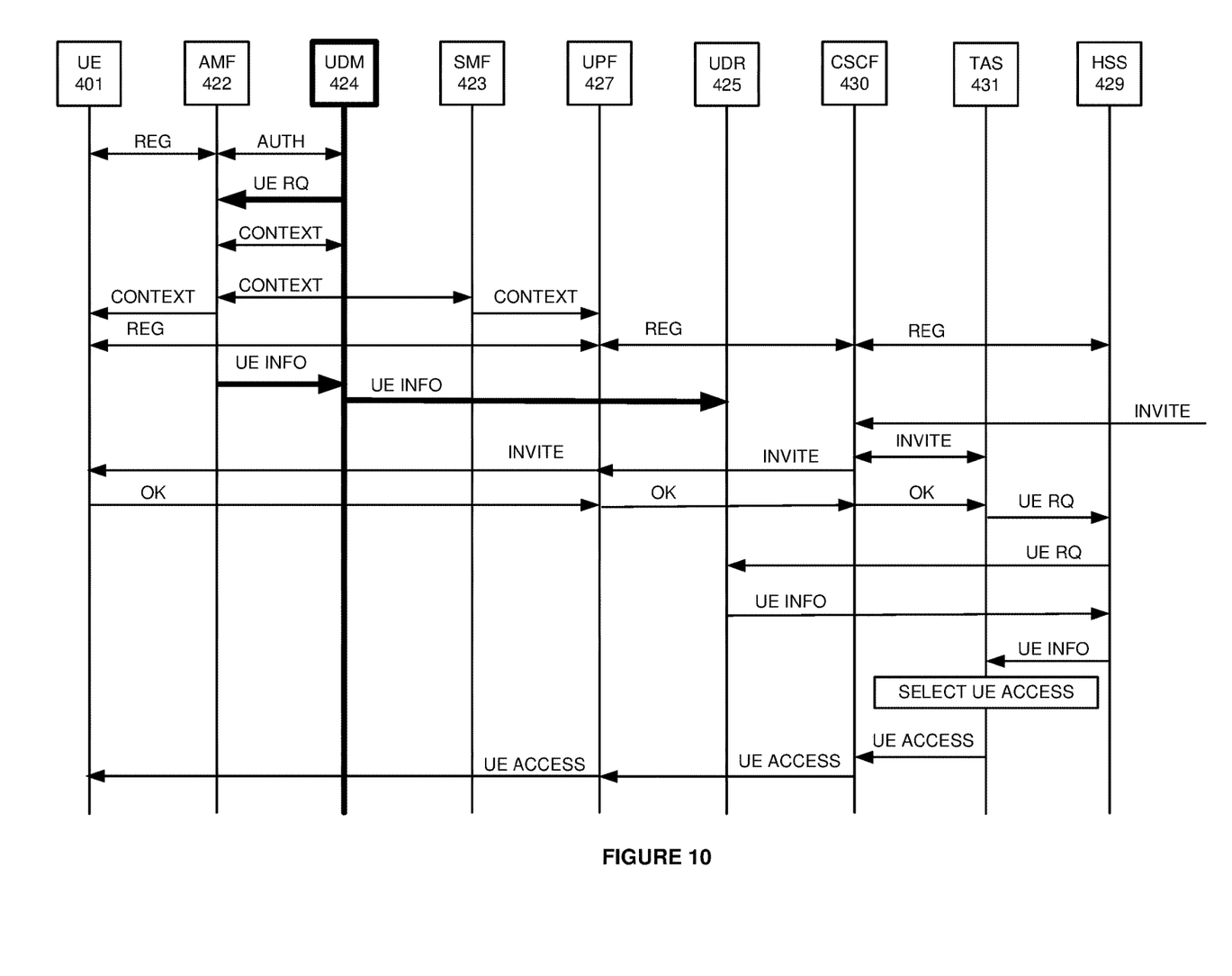
FIG. 10 illustrates an exemplary operation of the 5G wireless communication network to serve the UE and deliver the UE status information for the UE upon request.

FIG. 10 illustrates an exemplary operation of 5G wireless communication network 400 to serve UE 401 and deliver the UE status information for UE 401 upon request. The operation may vary in other examples. UE 401 and AMF 422 exchange registration signaling. The registration signaling reports UE capabilities to AMF 422 like VoP capability, IMS capability, SIP capability, geographic location, and authentication. In response to the registration signaling, AMF 422 and UDM 424 exchange authentication signaling for UE 401. In response to the authentication of UE 401, UDM 424 requests UE status information for UE 401 from AMF 422. AMF 422 interacts with UDM 424 to select initial context for UE 401. AMF 422 interacts with SMF 423 and other network functions to select slices, policies, addresses, and additional context for UE 401. Part of the context characterizes an IMS bearer between UE 401 and CSCF 430 over UPF 427. SMF 423 directs UPF 427 to serve the IMS bearer for UE 401 per the context. AMF 422 directs UE 401 to use the IMS bearer over 5GNR AN 411 per the context. UE 401 and CSCF 430 exchange IMS registration signaling over the IMS bearer which traverses UPF 427. CSCF 430 and HSS 429 exchange IMS registration data for UE 401. In response to the subscription for UE 401 from UDM 424, AMF 422 identifies UE status information that indicates: last radio contact, RAT type, VoP capability, IMS capability, SIP capability, geographic location, successful authentication, and/or some other UE metadata. AMF 422 transfers the UE status data for UE 401 to UDM 424 to serve the subscription. UDM 424 transfers the UE status data for UE 401 to UDR 425. UE 401 receives a multimedia call when an invite for UE 401 is received by CSCF 430 from another UE or IMS. CSCF 430 and TAS 431 exchange the invite. CSCF 430 forwards the invite to UE 401 over the IMS bearer served by UPF 427. UE 401 accepts (OK) the invite to CSCF 430 over the IMS bearer that traverses UPF 427. CSCF 430 transfers the acceptance to TAS 421. TAS 431 queries HSS 429 for the UE status information for UE 401 (UE RQ). HSS 429 retrieves the UE status information for UE 401 from UDR 425 and responds to TAS 431 with the UE status information for UE 401. TAS 431 selects an access network type for UE 401 based on the UE status information for UE 401. TAS 431 might select VoNR based on a 5GNR VoP capability for UE 401. TAS 431 might select CDMA fallback for UE 401 based on an inadequate VoP capability for UE 401. TAS 431 informs CSCF 430 of the selected access network type for UE 401. CSCF 430 informs AMF 422 of the selected access network type for UE 401—typically over a PCF. AMF 422 signals UE 401 to use the selected access network type. UE 401 typically uses the VoNR network that traverses UPF 427 if UE 401 is VoNR capable. UE 401 typically uses CDMA fallback network 440 when UE 401 is not VoNR capable.

Figure 11:
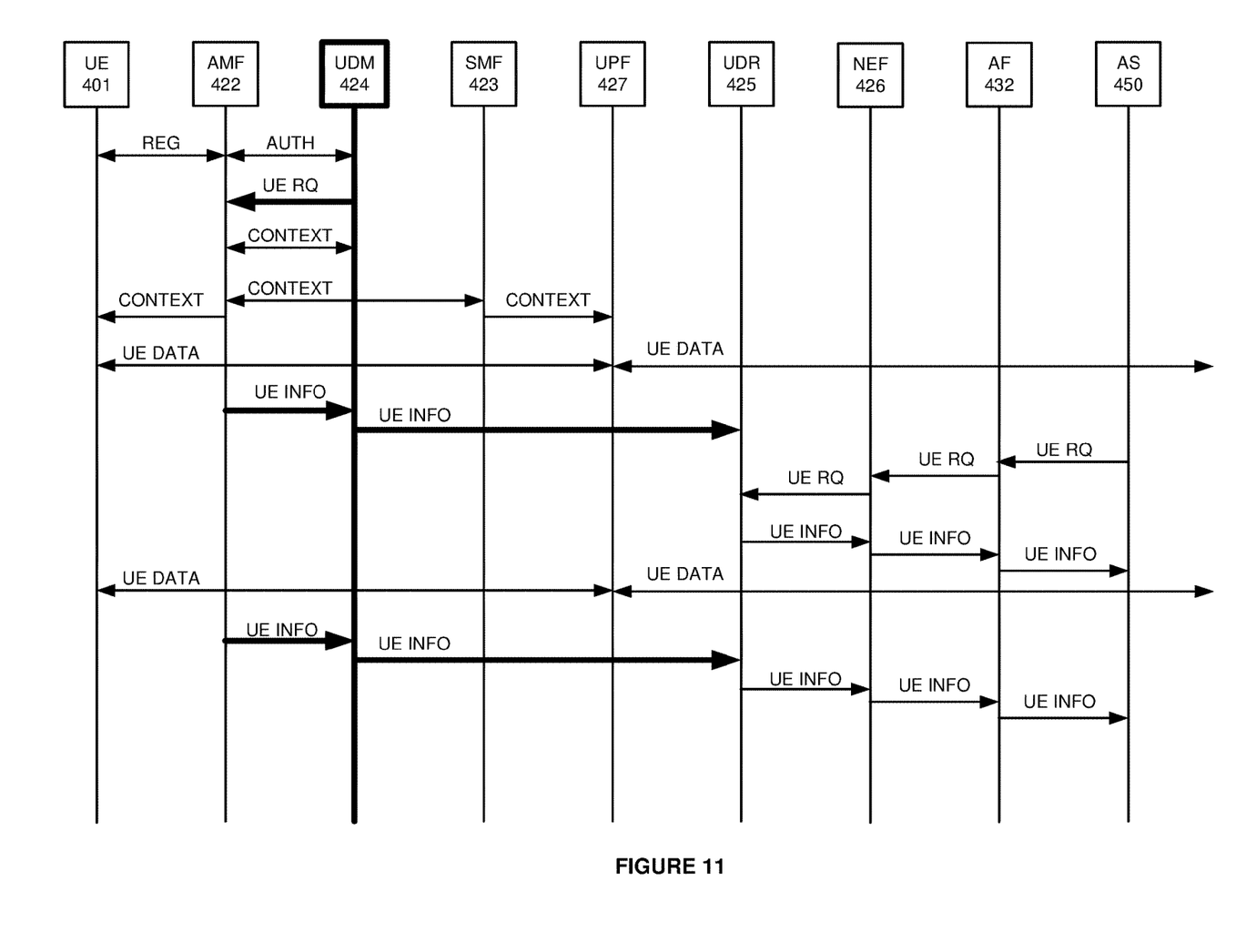
FIG. 11 illustrates an exemplary operation 5G wireless communication network to serve the UE and deliver the UE status information for the UE upon request.

FIG. 11 illustrates an exemplary operation of 5G wireless communication network 400 to serve UE 401 and deliver the UE status information for UE 401 upon request. The operation may vary in other examples. UE 401 and AMF 422 exchange registration signaling. The registration signaling reports UE capabilities to AMF 422 like VoP capability, IMS capability, SIP capability, and geographic location. In response to the registration signaling, AMF 422 and UDM 424 exchange authentication signaling for UE 401. In response to the authentication of UE 401, UDM 424 requests UE status information for UE 401 from AMF 422. AMF 422 interacts with UDM 424 to select initial context for UE 401. AMF 422 interacts with SMF 423 and other network functions to select slices, policies, addresses, and additional context for UE 401. Part of the context characterizes a data bearer for UE 401 over UPF 427. SMF 423 directs UPF 427 to serve the data bearer for UE 401 per the context. AMF 422 directs UE 401 to use the data bearer per the context. UE 401 and external systems exchange user data over the data bearer which traverses UPF 427. For example, UE 401 may comprise an environmental sensor that is sending carbon dioxide readings over the internet to a central server. In response to the subscription for UE 401 from UDM 424, AMF 422 identifies UE status information that indicates: last radio contact, RAT type, VoP capability, IMS capability, SIP capability, geographic location, successful authentication, and/or some other UE metadata. AMF 422 transfers the UE status data for UE 401 to UDM 424 to serve the subscription. UDM 424 transfers the UE status data for UE 401 to UDR 425. AS 450 has some affiliation with UE 401 like employer/employee, parent/child, sensor/owner, or the like. AS 450 logs-in to AF 432 and requests UE status information for UE 401. AF 432 requests the UE status information for UE 401 from NEF 431. NEF 431 requests the UE status information for UE 401 from UDR 425. UDR 425 has the UE status information for UE 401 as described above. UDR 425 transfers the UE status information for UE 401 to NEF 431. NEF 431 transfers the UE status information for UE 401 to AF 432. AF 432 transfers the UE status information for UE 401 to AS 450 for use by the employer, parent, owner, or other affiliated entity. For example, the owner of the environmental sensor and central server may want to know where UE 401 is, its RAT type, and when it was last authenticated. UE 401 exchanges additional user data over the data bearer and changes status like a new authentication over a new RAT type at a new geographic location. AMF 422 transfers the new UE status data for UE 401 to UDM 424 to serve the subscription. UDM 424 transfers the new UE status data for UE 401 to UDR 425. UDR 425 transfers the new UE status information for UE 401 to NEF 431. NEF 431 transfers the new UE status information for UE 401 to AF 432. AF 432 transfers the new UE status information for UE 401 to AS 450.

The wireless data network circuitry described above comprises computer hardware and software that form special-purpose networking circuitry to serve UEs and deliver individual UE status information upon request. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs and deliver individual UE status information upon request.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network that serves a User Equipment (UE) to deliver UE status information for the UE upon request, the method comprising:
   an Access and Mobility Management Function (AMF) exchanging registration signaling with the UE;
   the AMF responsively exchanging authentication signaling for the UE with a Unified Data Management (UDM);
   the UDM exchanging the authentication signaling with the network;
   the UDM responsively transferring a UDM request for the UE status information for the UE to the AMF;
   the AMF exchanging network signaling with the UE;
   the AMF determining the UE status information for the UE;
   the AMF receiving the UDM request for the UE;
   in response to the UDM request, the AMF transferring the UE status information for the UE to the UDM;
   the UDM receiving the UE status information from the AMF;
   the UDM transferring the UE status information to a Unified Data Repository (UDR);
   the UDR receiving the UE status information from the UDM;
   the UDR receiving a status request for the UE from a network element; and
   the UDR responsively transferring the UE status information for the UE to the network element, wherein the network element comprises one of an Application Function (AF), Network Exposure Function (NEF), Home Subscriber System (HSS), and Telephony Application Server (TAS).

2. The method of claim 1 wherein the UE status information for the for the UE indicates a time of last radio contact with the UE.

3. The method of claim 1 wherein the UE status information for the UE indicates a Radio Access Technology (RAT) type serving the UE.

4. The method of claim 1 wherein the UE status information for the UE indicates a Voice over Packet (VoP) capability for the UE.

5. The method of claim 1 wherein the UE status information for the UE indicates an Internet Protocol Multimedia Subsystem (IMS) capability for the UE.

6. The method of claim 1 wherein the UE status information for the UE indicates a Session Initiation Protocol (SIP) capability for the UE.

7. The method of claim 1 wherein the UE status information for the UE indicates a geographic location for the UE.

8. The method of claim 1 wherein the UE status information for the UE indicates a successful authentication for the UE.

9. A wireless communication network that serves a User Equipment (UE) to deliver UE status information for the UE upon request, the wireless communication network comprising:
   an Access and Mobility Management Function (AMF), a Unified Data Management (UDM), and a Unified Data Registry (UDR);
   the AMF configured to:
     exchange registration signaling with the UE; and
     responsively exchange authentication signaling for the UE with the UDM;
   the UDM configured to:
     exchange the authentication signaling with the AMF; and
     responsively transfer a UDM request for the UE status information for the UE to the AMF;
   the AMF configured to:
     exchange network signaling with the UE;
     determine the UE status information for the UE;
     receive the UDM request for the UE; and
     in response to the UDM request, transfer the UE status information for the UE to the UDM in response to the UDM request;
   the UDM configured to:
     receive the UE status information from the AMF; and
     transfer the UE status information to a Unified Data Repository (UDR) the UDR; and
   the UDR configured to:
     receive the UE status information from the UDM;
     receive a status request for the UE from a network element; and
     responsively transfer the UE status information for the UE to the network element, wherein the network element comprises one of an Application Function (AF), Network Exposure Function (NEF), Home Subscriber System (HSS), and Telephony Application Server (TAS).

10. The wireless communication network of claim 9 wherein the UE status information for the for the UE indicates a time of last radio contact with the UE.

11. The wireless communication network of claim 9 wherein the UE status information for the UE indicates a Radio Access Technology (RAT) type serving the UE.

12. The wireless communication network of claim 9 wherein the UE status information for the UE indicates a Voice over Packet (VoP) capability for the UE.

13. The wireless communication network of claim 9 wherein the UE status information for the UE indicates an Internet Protocol Multimedia Subsystem (IMS) capability for the UE.

14. The wireless communication network of claim 9 wherein the UE status information for the UE indicates a Session Initiation Protocol (SIP) capability for the UE.

15. The wireless communication network of claim 9 wherein the UE status information for the UE indicates a geographic location for the UE.

16. The wireless communication network of claim 9 wherein the UE status information for the UE indicates a successful authentication for the UE.

17. A Fifth Generation (5G) wireless communication network that serves a User Equipment (UE) to deliver UE status information for the UE upon request, the wireless communication network comprising:
   an Access and Mobility Management Function (AMF), a Unified Data Management (UDM), and a Unified Data Registry (UDR);
   the AMF configured to:
      exchange registration signaling with the UE; and
      responsively exchange authentication signaling for the UE with the UDM;
   the UDM configured to:
      exchange the authentication signaling with the AMF; and
      responsively transfer a UDM request for the UE status information for the UE to the AMF;
   the AMF configured to:
      exchange network signaling with the UE;
      determine the UE status information for the UE;
      receive the UDM request for the UE; and
      transfer the UE status information for the UE to the UDM in response to the UDM request;
   the UDM configured to:
      receive the UE status information from the AMF; and
      transfer the UE status information to the UDR; and
   the UDR configured to:
      receive the UE status information from the UDM;
      receive a status request for a time of last radio contact with the UE from an Application Function (AF); and
      responsively transfer the time of last radio contact with the UE to the AF.

18. The 5G wireless communication network of claim 9 wherein the UDR is configured to:
   receive a status request for the time of last radio contact with the UE and a Radio Access Technology (RAT) type serving the UE from the AF; and
   responsively transfer the time of last radio contact with the UE and the RAT type serving the UE to the AF.

19. The 5G wireless communication network of claim 9 wherein the UDR is configured to:
   receive a status request for the time of last radio contact with the UE and a Voice over Packet (VoP) capability for the UE from the AF; and
   responsively transfer the time of last radio contact with the UE and the VoP capability for the UE to the AF.

20. The 5G wireless communication network of claim 9 wherein the UDR is configured to:
   receive a status request for the time of last radio contact with the UE and an Internet Protocol Multimedia Subsystem (IMS) capability for the UE from the AF; and
   responsively transfer the time of last radio contact with the UE and the IMS capability for the UE to the AF.

* * * * *